US012516544B2

(12) United States Patent
Fuhrer

(10) Patent No.: US 12,516,544 B2
(45) Date of Patent: Jan. 6, 2026

(54) ABDUCTION PREVENTION DEVICE

(71) Applicant: Michelle Fuhrer, Lake Park, GA (US)

(72) Inventor: Michelle Fuhrer, Lake Park, GA (US)

(*) Notice: Subject to any disclaimer, the term of this patent is extended or adjusted under 35 U.S.C. 154(b) by 44 days.

(21) Appl. No.: 18/629,645

(22) Filed: Apr. 8, 2024

(65) Prior Publication Data

US 2024/0392606 A1 Nov. 28, 2024

Related U.S. Application Data

(60) Provisional application No. 63/468,123, filed on May 22, 2023.

(51) Int. Cl.
*E05B 19/00* (2006.01)
*B26B 1/02* (2006.01)
*B26B 9/02* (2006.01)

(52) U.S. Cl.
CPC ............ *E05B 19/0047* (2013.01); *B26B 1/02* (2013.01); *B26B 9/02* (2013.01)

(58) Field of Classification Search
CPC .......... E05B 19/0047; B26B 1/02; B26B 9/02
USPC ............................................................ 70/344
See application file for complete search history.

(56) References Cited

U.S. PATENT DOCUMENTS 5,460,022 A * 10/1995 Parsons ................ A45C 11/321 206/37.8
5,638,713 A * 6/1997 Roth ....................... E05B 19/26 206/38.1
7,520,149 B1 * 4/2009 Roemmele ........... B43K 24/084 70/459
8,667,822 B1 * 3/2014 Jaffe ........................ E05B 75/00 70/456 R
2008/0110028 A1 * 5/2008 Seber ......................... B26B 5/00 30/152
2012/0017442 A1 * 1/2012 King .......................... B26B 1/10 30/155
2013/0318798 A1 * 12/2013 Elsener ...................... B26B 1/10 30/156
2015/0240523 A1 * 8/2015 Chen ........................ E05B 75/00 70/344
2019/0061180 A1 * 2/2019 Nawaz ....................... B26B 1/02

FOREIGN PATENT DOCUMENTS

CN 216493897 U * 5/2022

* cited by examiner

*Primary Examiner* — Nathan Cumar
(74) *Attorney, Agent, or Firm* — Malcolm Pipes

(57) ABSTRACT

An escape device formed as a small elongated stainless steel metal body having a first end and a second end. The first end comprises a key bow and a folding mechanism adjacent to the key bow. The folding mechanism attaches to a knife blade and permits up to 180° of rotation by the knife when in an open configuration. The second end comprises a tubular cross section and an extending bit to fit into a key post of a standard pair of handcuffs and engage the locking mechanism. A longitudinal recess in the elongated body cab receive the folded knife blade so as to fit flush with the longitudinal recess to be fully retained and concealed. The elongated metal body further comprises decorative visual elements.

20 Claims, 1 Drawing Sheet

ABDUCTION PREVENTION DEVICE

CROSS REFERENCE TO RELATED APPLICATIONS

This application claims benefit of U.S. Provisional Application 63/468,123, filed May 22, 2023, which is incorporated herein.

FIELD OF INVENTION

The present invention relates to the field of a unlocking and cutting device, more specifically for assisting an individual to escape from an abduction or hostage situation by being able to remove bonds or handcuffs.

BACKGROUND

Each day there are reports about individuals who are abducted from their homes, schools, or place of work. In many cases, the abductor binds the hands of the individual as quickly as possible to prevent them from being able to fight back and/or attempt to escape. There are a large number of commercially available items for assisting an individual during an abduction attempt such as whistles, pepper spray, stun guns and phone apps having panic buttons, for example.

Although useful for their intended purpose, these items are immediately recognizable to abductors, and thus are among the first things an abductor will attempt to defeat when approaching the victim. Moreover, once the victim has been subdued and their hands are bound, these devices are immediately discarded by the abductor thus rendering them useless in any future attempt to escape. On the other hand, once bound and secured, often times abductors pay scant attention to the victim.

Accordingly, it would be beneficial to provide an abduction prevention device that is formed as or embedded within a decorative element so as to shield the true purposes of the device. It would also be beneficial if the device was able to be used by an individual to remove bonds such as ropes, zip ties or handcuffs in order to allow an individual to free their hands and escape.

An abduction prevention device is described below. Although described as including a specific number, shape, size, type or orientation of components, this is for illustrative purposes only. As such, the inventive concepts can include any number of different components each capable of performing any number of different functions. Moreover, each of the components can be provided along the device body at any number of different locations.

The device is intended to be carried in plain view and is designed to look harmless and merely perceived as a decorative item, such as jewelry. However, it is further intended to be easily retrieved and utilized to quickly cut through bounds or unlock a handcuff.

Based on the foregoing, there is a need in the cutting and unlocking device for a otherwise harmless appearing device to be accessible to a victim to use to free themselves.

SUMMARY

In one exemplary embodiment, the abduction prevention device can include a knife and a handcuff key that are formed as part of a main body having a decorative shape that hides the appearance of the knife and key.

As described herein, the main body can be constructed from any number of different materials and can include any number of different shapes and sizes. For example, the figures show a nonlimiting example wherein the main body is constructed in the shape of a decorative key having a loop along the top end. In such an embodiment, the main body can preferably be constructed from metal such as stainless steel and/or can be painted gold or plated with gold or painted/plated silver, so as to appear to be an ordinary piece of fine jewelry. The opening along the top end of the key can function to receive a necklace or bracelet that allows the main body to be worn as necklace or bracelet charm.

Of course, the main body can also include any number of different construction materials, and can include any number of different colors than what is described above. Furthermore, the main body may be adorned with any number of decorative elements such as various markings, logos, pictures, jewels and the like, so as to suit the tastes of a consumer to be worn as a piece of jewelry while disguising and concealing the presence of the knife blade and key.

In an embodiment, the bottom end of the main body can be formed to function as a handcuff key having a central aperture and a protrusion that extends outward generally perpendicular angle to the opening. As is known in the art, commercially available handcuffs are produced to lock and unlock using an industry-standard handcuff key. As such, the handcuff key provided along the main body will include the same shape and dimensions of the industry standard key so as to allow the main body to be used to unlock handcuffs.

Although illustrated as the bottom end of the main body having a fanciful key-shape, this is but one possible implement of the device. To this end, other exemplary embodiments are contemplated wherein the handcuff key is 1) provided along a different part of the main body; 2) hidden within the main body so as to be selectively extended therefrom while remaining attached; or 3) hidden within or along the main body so as to be separated therefrom when used to unlock handcuffs.

In an exemplary embodiment, the knife can include an elongated member, or blade, having a sharpened edge and a non-sharpened edge. In various embodiments, the knife can be connected to the main body via a hinge allowing the elongated member to fold into and away from the main body itself. In some embodiments, a nub or indention can be provided along the non-sharpened, dull edge to permit a user to manually transition the blade from the folded position to an unfolded position. The cutting effectiveness of the blade may be enhanced by adding serrations.

In one embodiment, when the knife member is in the resting position, the sharp edge of the blade can be within or alongside the main body such that only the non-sharpened edge is visible. As such, the non-sharpened edge will preferably include a similar color or matching to the main body so as to remain disguised. When the blade is opened, it can transition to a position that is perpendicular to the main body and/or can transition to be serially oriented with the main body and extending outward from the top end.

Such positionings allow a user to grip the main body of the device itself and use the sharpened edge of the blade to cut bonds in any number of different positions while their hands are bound. Although described above as including specific components located at specific positions along the main body, this is for illustrative purposes only. To this end, the knife and key can each be removably or permanently positioned anywhere along or within the main body so as to be accessible to a user for the purposes described herein.

In an exemplary embodiment, a cutting/key device for use by an abduction victim to escape restraint comprises a small elongated metal body incorporating a fully recessed folding knife blade. A first end forms a key bow and is attached to a retention structure. A second end with a tubular cross section and an extending bit can fit into a key post of a standard pair of handcuffs. Wherein the elongated metal body comprises a slot forming a longitudinal recess into which folding knife blade fits so as to be fully retained and concealed and the metal body further incorporates visual decorative elements.

In an exemplary embodiment, an emergency freeing device to escape restraint comprises a small elongated metal body with a first end and a second end. The first end forms a key bow and includes a folding mechanism adjacent to the key bow. The second end comprises a tubular cross section and an extending bit to fit into a key post of a standard pair of handcuffs. A longitudinal recess in the elongated body receives a knife blade attached to the folding mechanism wherein the knife blade folds to fit flush in the recess to be fully retained and concealed. The elongated metal body further comprises decorative visual elements.

In an exemplary embodiment, an escape device to escape restraints comprises a small elongated stainless steel metal body having a first end and a second end. The first end comprises a key bow and a folding mechanism adjacent to the key bow, said folding mechanism attached to a knife blade and permitting up to 180° of rotation by the knife blade when in an open configuration. The second end comprising a tubular cross section and an extending bit to fit into a key post of a standard pair of handcuffs and engage a locking mechanism. A longitudinal recess in the elongated body into which the folded knife blade fits into so as to fit flush with the longitudinal recess to be fully retained and concealed when in a closed configuration, and the elongated metal body further comprises decorative visual elements.

Advantages

1. Benign appearance concealing its true purpose from an abductor.
2. Attractive in its own right as a decorative item of jewelry.
3. Ease to access and utilize even if bound or handcuffed
4. Simple to implement and durable.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

The foregoing, and other features and advantages of the invention, will be apparent from the following, more particular description of the preferred embodiments of the invention, the accompanying drawings, and the claims.

DETAILED DESCRIPTION OF PREFERRED EMBODIMENTS

Figure 1:
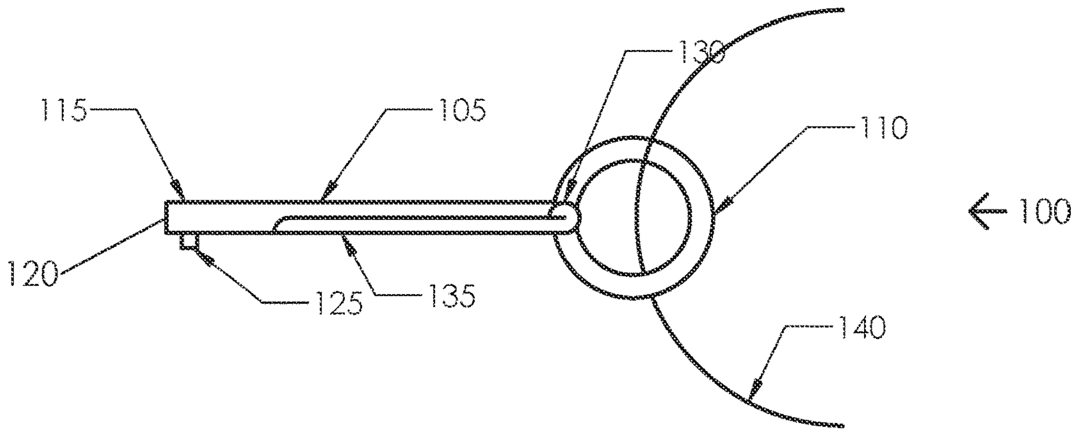
FIG. 1 is an exemplary side view of the freeing device, according to an embodiment of the present invention.
Figure 2:
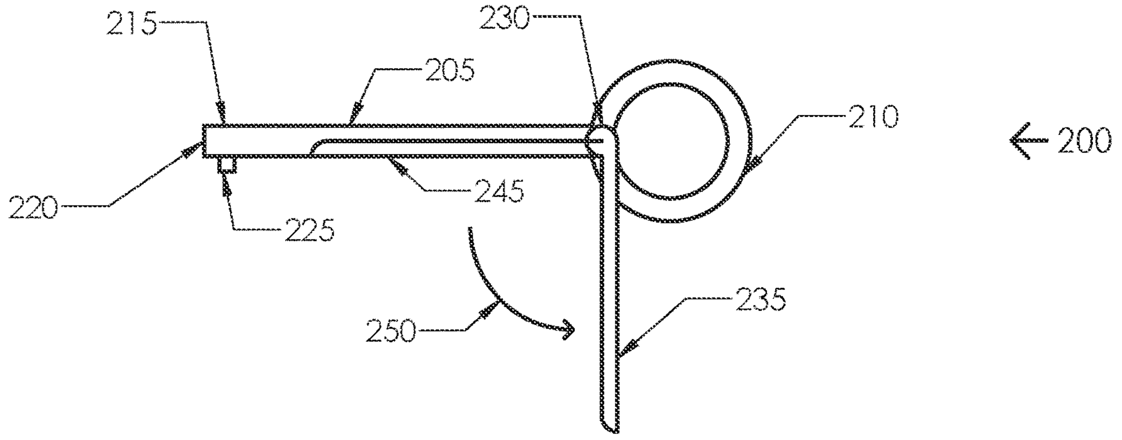
FIG. 2 is an exemplary side view of the freeing device with the knife blade partially extended, according to an embodiment of the present invention.
Figure 3:
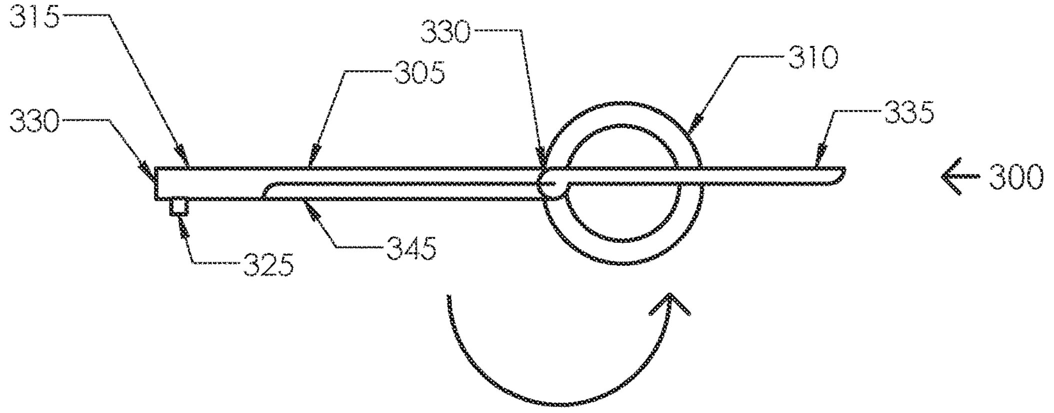
FIG. 3 is an exemplary side view of the freeing device with the knife blade fully extended in an open configuration, according to an embodiment of the present invention.

Preferred embodiments of the present invention and their advantages may be understood by referring to FIGS. 1-3, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

As described throughout this document, the term "removably secured" and derivatives thereof shall be used to describe a situation wherein two or more objects are joined together in a non-permanent manner so as to allow the same objects to be repeatedly joined and separated. This can be accomplished through the use of any number of different "connectors". Several nonlimiting examples of connectors include, but are not limited to, flexible strips of interlocking projections with a slider (i.e., zipper), thread-to-connect, twist-to-connect, and push-to-connect type devices, opposing strips of hook and loop material (e.g., Velcro®), attractively-oriented magnetic elements or magnetic and metallic elements, buckles such as side release buckles, clamps, sockets, clips, carabiners, and compression fittings such as T-handle rubber draw latches, hooks, snaps and buttons, for example.

Each illustrated connector can be permanently secured to the illustrated portion of the device via a permanent sealer such as glue, adhesive tape, or stitching, for example. Moreover, the term "permanently secured" shall be used to describe a situation wherein two or more objects are joined together in a manner so as to prevent the same objects from being separated. Several nonlimiting examples of permanent connectors include various adhesives such as glue or resin, hardware such as nuts and bolts, and welds, for example.

Devices or system modules that are in at least general communication with each other need not be in continuous communication with each other, unless expressly specified otherwise. In addition, devices or system modules that are in at least general communication with each other may communicate directly or indirectly through one or more intermediaries.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

FIG. 1 shows an embodiment of a side view of the cutting/key device 100. While the depicted cutting/key device takes the form of a decorative, but distinct key device, it is contemplated that this item will be further embellished to camouflage its utility as a key. As depicted, an elongated body 105 can include a first end 110 and a second end 115. The first end, or bow 110, can provide a grip for manipulating the key and turning the lock mechanism of a pair of handcuffs to unlock the pawl and free the ratchet teeth to open the cuffs. Furthermore, the bow 110 configuration can allow for passing a chain, cable, or wire 140 through and thus secure the cutting/key device 100 to a necklace chain, wire, or cable 140 so as to appear to be part of a necklace around a neck or charm on a bracelet or some other item of jewelry. Further, in some embodiments, it is contemplated that bow 110 will incorporate decorative visual elements.

The second end 115 can comprise a round tubular cross section 120. A bit 125 can extend perpendicular from end 115. The tubular cross section 120 and bit 125 can be sized to fit into a handcuff's key post to engage with the locking mechanism and unlock a pair of handcuffs.

As depicted, the elongated body 105 can further accommodate a knife blade 135 incorporated into a slot in the elongated body 105 and attached to a folding mechanism 130. The knife blade 105 and elongated body 105 can be mated in such a way so that the knife blade 135 fits snugly into a longitudinal recess secured and fully concealed till needed. In operation, a user can access the fully recessed knife blade 135 to open it for use. It is contemplated that the knife blade 135 will comprise a stainless steel blade between 1½" and 4" long.

FIG. 2 shows an embodiment of a side view of the cutting/key device 200. While the depicted cutting/key device takes the form of a decorative, but distinct key device, it is contemplated that this item will be further embellished to camouflage its utility as a key. As depicted, an elongated body 205 can include a first end 210 and a second end 215. The first end, or bow 210, can provide a grip for manipulating the key and turning the lock mechanism of a pair of handcuffs to unlock the pawl and free the ratchet teeth to open the cuffs. Furthermore, the bow 210 configuration can allow for passing a chain, cable, or wire 240 through and thus secure the cutting/key device 200 to a necklace chain, wire, or cable 240 so as to appear to be part of a necklace around a neck or charm on a bracelet or some other item of jewelry. Further, in some embodiments, it is contemplated that bow 210 will incorporate decorative visual elements.

The second end 215 can comprise a round tubular cross section 220. A bit 225 can extend perpendicular from end 215. The tubular cross section 220 and bit 225 can be sized to fit into a handcuff's key post to engage with the locking mechanism and unlock a pair of handcuffs.

As depicted, the elongated body 205 can further accommodate a knife blade 235 that can be incorporated into a slot 245 in the elongated body 205 and attached to a folding mechanism 230. As depicted, knife blade 205 can be open to 90° 250 extending outward from elongated body 205 and attached to folding mechanism 230. The slot 245 can form a longitudinal recess into which knife blade 235 fits so as to be fully retained and concealed when in a closed configuration.

FIG. 3 shows the same embodiment of a side view of the cutting/key device 300. While the depicted cutting/key device takes the form of a decorative, but distinct key device, it is contemplated that this item will be further embellished to camouflage its utility as a key. As depicted, an elongated body 305 can include a first end 310 and a second end 315. The first end, or bow 310, can provide a grip for manipulating the key and turning the lock mechanism of a pair of handcuffs to unlock the pawl and free the ratchet teeth to open the cuffs. Furthermore, the bow 310 configuration can allow for passing a chain, cable, or wire 340 through and thus secure the cutting/key device 300 to a necklace chain, wire, or cable 340 so as to appear to be part of a necklace around a neck or charm on a bracelet or some other item of jewelry. Further, in some embodiments, it is contemplated that bow 310 will incorporate decorative visual elements.

The second end 315 can comprise a round tubular cross section 320. A bit 325 can extend perpendicular from end 315. The tubular cross section 320 and bit 325 can be sized to fit into a handcuff's key post to engage with the locking mechanism and unlock a pair of handcuffs.

As depicted, the elongated body 305 can further accommodate a knife blade 335 that can be incorporated into a slot 345 in the elongated body 305 and attached to a folding mechanism 330. As depicted, knife blade 305 can be fully open to 180° 350 extending outward from elongated body 305 and attached to folding mechanism 330. The slot 345 can form a longitudinal recess into which knife blade 335 fits so as to be retained and concealed when in a closed configuration.

Insofar as the description above and the accompanying drawing disclose any additional subject matter that is not within the scope of the single claim below, the inventions are not dedicated to the public and the right to the one or more applications to claim such additional inventions is reserved.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The foregoing has described methods and systems for a patient movement monitoring and feedback system that are given for illustration and not for limitation and uses. Thus, the inventions are limited only by the appended claims. Although the inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventors. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventors contemplate the various aspects in any number of claim forms. Accordingly, the inventors reserve the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Various sizes can be utilized by the cutting/key device. However, it is contemplated that a size of about 4" will provide the best disguise while still be large enough for utility.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

I claim:

1. A cutting/key device for use by an abduction victim to escape restraint, comprising:

a small elongated metal body incorporating a fully recessed folding knife blade;

a first end forming a key bow having an aperture formed therethrough dimensioned and configured to receive a retention structure therethrough for attachment to the key bow;

a second end with a tubular cross section and an extending bit to fit into a key post of a standard pair of handcuffs;

wherein the elongated metal body comprises a slot forming a longitudinal recess into which folding knife blade fits so as to be fully retained and concealed and the metal body further incorporates visual decorative elements.

2. The cutting/key device for use by an abduction victim to escape restraint of claim 1, further comprising:

the retention structure configured to form a necklace or bracelet.

3. The cutting/key device for use by an abduction victim to escape restraint of claim 1, further comprising:

the key bow embellished with visual decorative elements to enhance the cutting/key device appearance as a piece of jewelry.

4. The cutting/key device for use by an abduction victim to escape restraint of claim 1, wherein the visual decorative elements comprise gold or silver plating or coloring.

5. The cutting/key device for use by an abduction victim to escape restraint of claim 1, wherein the metal body of the cutting/key device comprises stainless steel.

6. The cutting/key device for use by an abduction victim to escape restraint of claim 1, wherein the folding knife blade comprises stainless steel.

7. The cutting/key device for use by an abduction victim to escape restraint of claim 1, wherein the folding knife blade comprises a serrated edge.

8. An emergency freeing device to escape restraint, comprising:

a small elongated metal body with a first end and a second end;

the first end forming a key bow having an aperture formed therethrough dimensioned and configured to receive a retention structure therethrough for attachment to the key bow;

a folding mechanism adjacent to the key bow;

the second end comprising a tubular cross section and an extending bit to fit into a key post of a standard pair of handcuffs;

a longitudinal recess in the elongated body receiving a knife blade attached to the folding mechanism wherein the knife blade folds to fit flush in the recess to be fully retained and concealed; and the elongated metal body further comprises decorative visual elements.

9. The emergency freeing device to escape restraint of claim 8, further comprising:

a retention structure attached to the key bow to form a piece of jewelry.

10. The emergency freeing device to escape restraint of claim 8, further comprising:

the key bow embellished with visual decorative elements to enhance the freeing device appearance as a piece of jewelry.

11. The emergency freeing device to escape restraint of claim 8, wherein the visual decorative element comprises gold or silver plating or coloring.

12. The emergency freeing device to escape restraint of claim 8, wherein the metal body of the freeing device comprises stainless steel.

13. The emergency freeing device to escape restraint of claim 8, wherein the knife blade comprises stainless steel.

14. The emergency freeing device to escape restraint of claim 8, wherein the knife blade comprises a serrated edge.

15. An escape device to escape restraints, comprising:

a small elongated stainless steel metal body having a first end and a second end;

the first end comprising a key bow having aperture formed therethrough dimensioned and configured to receive a retention structure therethrough for attachment to the key bow;

a folding mechanism adjacent to the key bow, the folding mechanism attached to a knife blade and permitting up to 180° of rotation by the knife blade when in an open configuration;

the second end comprising a tubular cross section and an extending bit to fit into a key post of a standard pair of handcuffs and engage a locking mechanism;

a longitudinal recess in the elongated body into which the folded knife blade fits into so as to fit flush with the longitudinal recess to be fully retained and concealed when in a closed configuration; and the elongated metal body further comprises decorative visual elements.

16. The emergency freeing device to escape restraint of claim 15, further comprising:

a retention structure attached to the key bow to form a piece of jewelry.

17. The emergency freeing device to escape restraint of claim 15, further comprising:

the key bow embellished with visual decorative elements to enhance the escape device appearance as a piece of jewelry.

18. The emergency freeing device to escape restraint of claim 15, wherein the visual decorative element comprises gold or silver plating or coloring.

19. The emergency freeing device to escape restraint of claim 15, wherein the metal body of the freeing device comprises stainless steel.

20. The emergency freeing device to escape restraint of claim 15, wherein the knife blade comprises a serrated stainless steel edge.

* * * * *